US012315348B2

(12) United States Patent
Bidmade et al.

(10) Patent No.: US 12,315,348 B2
(45) Date of Patent: May 27, 2025

(54) CUMMULATIVE POINT, CARD-ELIMINATION, WAGERING SYSTEM

(71) Applicants: Christopher R. Bidmade, Wurtulla (AU); Bernard Pickett, Applecross (AU)

(72) Inventors: Christopher R. Bidmade, Wurtulla (AU); Bernard Pickett, Applecross (AU)

( * ) Notice: Subject to any disclaimer, the term of this patent is extended or adjusted under 35 U.S.C. 154(b) by 278 days.

(21) Appl. No.: 18/196,006

(22) Filed: May 11, 2023

(65) Prior Publication Data

US 2024/0378969 A1 Nov. 14, 2024

(51) Int. Cl.
*G07F 17/32* (2006.01)

(52) U.S. Cl.
CPC ...... *G07F 17/3293* (2013.01); *G07F 17/3211* (2013.01); *G07F 17/322* (2013.01); *G07F 17/3244* (2013.01); *G07F 17/3276* (2013.01); *G07F 17/3209* (2013.01)

(58) Field of Classification Search
CPC ............. G06F 17/3293; G06F 17/3211; G06F 17/322; G06F 17/3244; G06F 17/3276; G06F 17/3209; G06F 17/3267; G06F 13/45; G06F 17/3225; G06F 17/3262
USPC ................................................ 463/11, 12, 13
See application file for complete search history.

(56) References Cited

U.S. PATENT DOCUMENTS 5,653,635 A 8/1997 Breeding
5,882,258 A 3/1999 Kelly et al.
12,100,268 B2 * 9/2024 Colvin ................ G07F 17/3213
2010/0113140 A1 * 5/2010 Kelly ...................... G07F 17/32 463/30
2014/0094256 A1 * 4/2014 Hilbert .................... G07F 17/34 463/20
2014/0094298 A1 * 4/2014 Lyons ................. G07F 17/3204 463/31
2018/0021667 A1 1/2018 Mahon
2024/0029516 A1 * 1/2024 Colvin ................ G07F 17/3258

FOREIGN PATENT DOCUMENTS

AU 2021203498 5/2021

OTHER PUBLICATIONS

Tens Solitaire [retrieved from internet on Oct. 25, 2024] <URL:https://web.archive.org/web/20220702014611/https:/www.gemsolitaire.com/play/tens.

(Continued)

*Primary Examiner* — Pierre E Elisca
(74) *Attorney, Agent, or Firm* — MARK A. LITMAN & ASSOCIATES, P.A.

(57) ABSTRACT

The present invention relates to a player activity wagering event in which a set of playing cards or virtual gaming elements, which may be or represent a standard playing card deck (i.e., 52 cards, Ace, 2, 3, 4, 5, 6, 7, 8, 9, 10, Jack, Queen and King of four different suits) or a modified set (with fewer cards, additional cards between 16 and even above 56 cards, and optional specialty cards having specific functions added to the basic 52 cards. Cards are eliminated from an original displayed subset, replaced from residual sets of cards, and awards are given on the basis of progress through the displayed and residual sets, and specific cards remaining. The execution of the game can be performed with real physical gaming elements and virtual gaming elements.

18 Claims, 6 Drawing Sheets

(56) References Cited

OTHER PUBLICATIONS

Play Sum 10 Solitaire Jul. 5, 2022 Play Sum of 10 Solitaire | Solitaire.io.

1. Pyramid Solitaire—Build 10—Made for Math madeformath.com/pyramid-solitaire-build-10 Jul. 5, 2022.

* cited by examiner

Figure 2

First Virtual Set

| | | | | | | | | | |
|---|---|---|---|---|---|---|---|---|---|
| 2 | 4 | 3 | 9 | 8 | 7 | 10 | Jack | Ace | 6 |

↓ First Elimination of 12-Count

| | | | | | | | | | |
|---|---|---|---|---|---|---|---|---|---|
| 2 | | 3 | 9 | | 7 | 10 | Jack | Ace | 6 |

↓ Replace Eliminated Elements

| | | | | | | | | | |
|---|---|---|---|---|---|---|---|---|---|
| 2 | 6 | 3 | 9 | 2 | 7 | 10 | Jack | Ace | 6 |

↓ Second Elimination of 12-Count

| | | | | | | | | | |
|---|---|---|---|---|---|---|---|---|---|
| 2 | 6 | 3 | 9 | | 7 | | Jack | Ace | 6 |

↓ Replace Eliminated Elements

| | | | | | | | | | |
|---|---|---|---|---|---|---|---|---|---|
| 2 | 6 | 3 | 9 | 5 | 7 | 5 | Jack | Ace | 6 |

↓ Third Elimination of 12-Count

| | | | | | | | | | |
|---|---|---|---|---|---|---|---|---|---|
| 2 | 6 | 3 | 9 | | | 5 | Jack | Ace | 6 |

CUMMULATIVE POINT, CARD-ELIMINATION, WAGERING SYSTEM

BACKGROUND OF THE INVENTION

1. Field of the Invention

The present invention relates to a wagering event, executed at a live card or tile gaming table or in virtual format by execution of software by a processor after player entry of a wager placed at risk. The gaming event may be played by single players against the house in either gaming milieu or can be played against other players.

2. Background of the Art

There are numerous games in which playing cards (real or virtual) are used with their individual or collective 'points' (e.g., the count of card values) used to determine outcomes. The most common of these are blackjack, baccarat, cribbage, War, chemin de fer, and the like. Tiles are similarly used as equivalents to cards or used in separate gaming events such as dominos.

In each of these standard playing card games, a defined limited number of playing cards are provided in each round of play, and outcomes are determined according to set comparative information used to interpret hands.

There are a number of tile games (such as dominos and Triominos™ game) in which players are provided with an initial set of tiles, and winning is determined by a first player placing all tiles on the table. If the players are all blocked from placing more tiles, a player with the fewest tiles or points wins. These are referred to as 'hand elimination' gaming events.

Solitaire is another example of an elimination game in which the object to end up with all active playing cards transferred from a play area into receiving piles or sets, eliminating all cards from the playing area. This is typically done with the receiving piles collecting cards by both suit and order of the cards.

Another example of an elimination game is "Concentration," in which cards are distributed face down on a surface, and when identical cards are revealed in the same turn, they are removed and counted as points (without respect to the images or points on them) for the player who matched the cards.

With the exception of the limited success following blackjack and baccarat on electronic gaming machines (EGMs), no other games have a had long, successful presence in electronic formats.

Additional games with different content and play are always sought out for use in the gaming industry.

SUMMARY OF THE INVENTION

The present invention relates to a player activity wagering event in which a set of playing cards, which may be a standard playing card deck (i.e., 52 cards, A, 2, 3, 4, 5, 6, 7, 8, 9, 10, Jack, Queen and King of four different suits) or a modified set (with fewer cards, additional cards between 16 and even above 56 cards, and optional specialty cards having specific functions added to the basic 5 cards.

More broadly, the present invention relates to a gaming event, gaming method and a gaming system which includes at least:

a display system; player input controls, and a game controller comprising one or more processors; and a random number generator;

the game controller executing instructions which cause the game controller to:

a) randomly select and display on the display system virtual images of at least four and fewer than twenty virtual gaming elements randomly selected from a first original set of virtual gaming elements, at least the majority of which virtual gaming elements having indicia thereon representing numeric values;

b) the removal of the at least four virtual gaming elements creating a first residual set of virtual gaming elements of at least four virtual gaming elements;

c) a player at the gaming controls identifying two of the at least four displayed virtual gaming elements as having a single specific predetermined numerical value;

d) upon identification by the player of the identified two of the at least four displayed virtual gaming elements having the single specific predetermined numerical value, the processor executes software to remove the virtual images of the identified two of the at least four displayed virtual gaming elements from the display screen;

e) after remove the virtual images of the identified two of the at least four displayed virtual gaming elements from the display screen, the game controller randomly selects exactly two virtual gaming elements from the first residual set of virtual gaming elements, replenishing the virtually displayed images of at the least four and fewer than twenty virtual gaming elements, and creating a subsequent set of residual virtual gaming elements;

f) repeating actions b), c), d) and e), with decreasingly fewer virtual gaming elements in the subsequent set of residual virtual gaming elements until one of the following categories of concluding event has occurred:

A. All virtual gaming elements in the first original set of virtual gaming elements (which may be playing cards) have been removed from the subsequent set of residual virtual gaming elements and removed from the display screen;

B. All virtual gaming elements in the first original set of virtual gaming elements have been removed from the subsequent set of residual virtual gaming elements and some virtual gaming elements remain on the display screen;

C. Less than all virtual gaming elements in the first original set of virtual gaming elements have been removed from the subsequent set of residual virtual gaming elements and virtual gaming elements having a same number as remain on the display screen as the randomly selected least four and fewer than twenty virtual gaming elements, and at least a predetermined number of the first original set of virtual gaming elements have been removed during execution of multiple repetitions of b), c), d) and e) has been met or exceeded; and D. Less than all virtual gaming elements in the first original set of virtual gaming elements have been removed from the subsequent set of residual virtual gaming elements and virtual gaming elements having a same number as remain on the display screen as the randomly selected least four and fewer than twenty virtual gaming elements, and at least a predetermined number of the first original set of virtual gaming elements have been removed during execution of multiple repetitions of b), c), d) and e) has not been met or exceeded;

wherein after a concluding event has occurred, the gaming processor determines and delivers an award for the player at least based upon which category of concluding event has occurred.

BRIEF DESCRIPTION OF THE FIGURES

FIG. 2 shows a basic flow diagram of first steps of progression through an elimination gaming event, with ten (10) original virtual gaming elements.

DETAILED DESCRIPTION OF THE INVENTION

Figure 1:
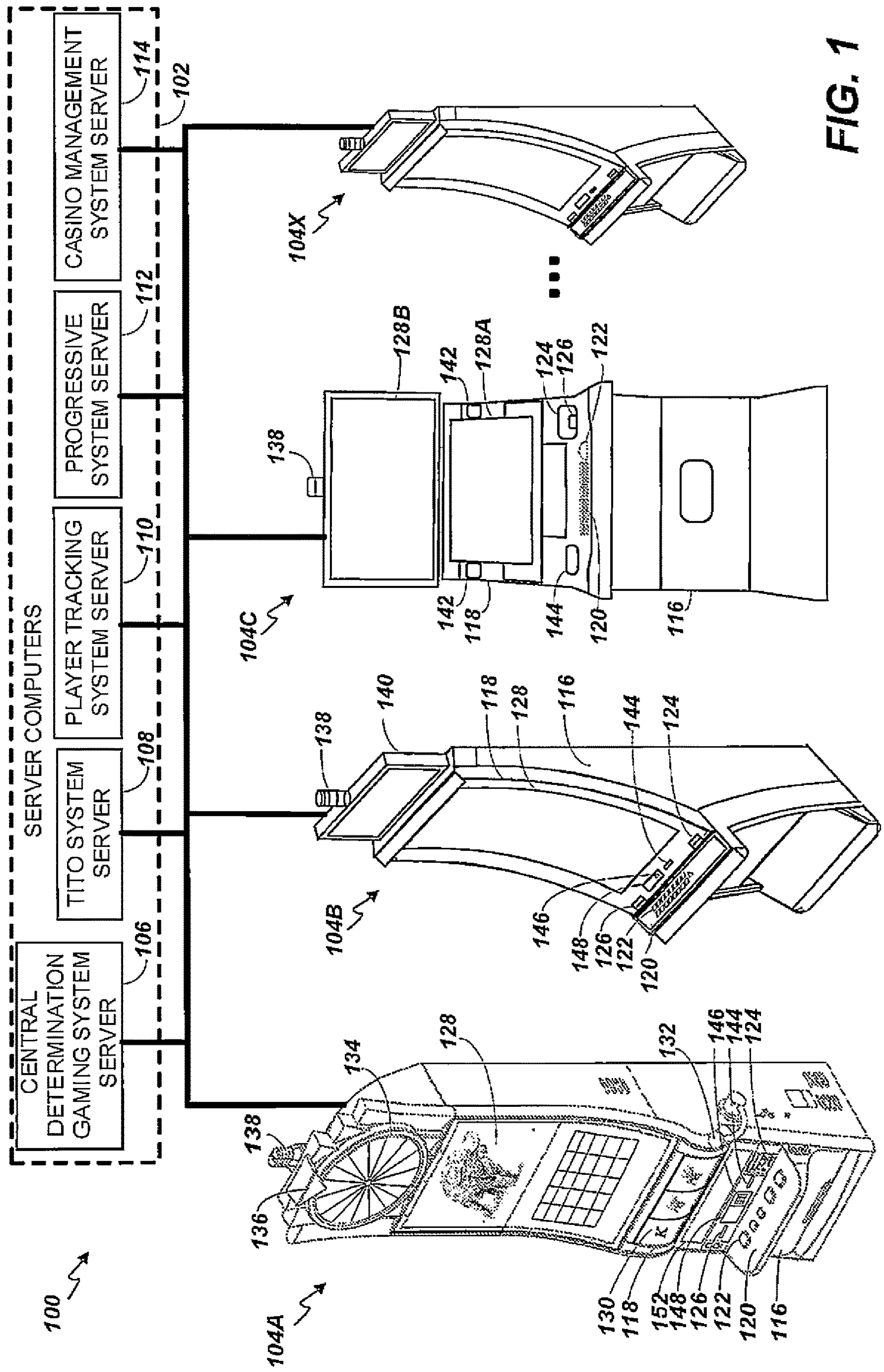
FIG. 1 illustrates several different models of EGMs which may be networked to various gaming related servers.

As noted, the technology of the present invention may be executed in a physical form (with playing cards, playing tiles, and other physical elements), but the emphasis in this disclosure will be in its execution as an electronic gaming event.

the present invention relates to a gaming event and a gaming system which includes at least:

a display system; player input controls, and a game controller comprising one or more processors; and a random number generator;

the game controller executing instructions which cause the game controller to:

a) randomly select and display on the display system virtual images of at least four and fewer than twenty virtual gaming elements randomly selected from a first original set of virtual gaming elements, at least the majority of which virtual gaming elements having indicia thereon representing numeric values;

b) the removal of the at least four virtual gaming elements creating a first residual set of virtual gaming elements of at least four virtual gaming elements;

c) a player at the gaming controls identifying two of the at least four displayed virtual gaming elements as having a single specific predetermined numerical value;

d) upon identification by the player of the identified two of the at least four displayed virtual gaming elements having the single specific predetermined numerical value, the processor executes software to remove the virtual images of the identified two of the at least four displayed virtual gaming elements from the display screen;

e) after remove the virtual images of the identified two of the at least four displayed virtual gaming elements from the display screen, the game controller randomly selects exactly two virtual gaming elements from the first residual set of virtual gaming elements, replenishing the virtually displayed images of at the least four and fewer than twenty virtual gaming elements, and creating a subsequent set of residual virtual gaming elements;

f) repeating actions b), c), d) and e), with decreasingly fewer virtual gaming elements in the subsequent set of residual virtual gaming elements until one of the following categories of concluding event has occurred:

A. All virtual gaming elements in the first original set of playing cards have been removed from the subsequent set of residual virtual gaming elements and removed from the display screen;

B. All virtual gaming elements in the first original set of virtual gaming elements have been removed from the subsequent set of residual virtual gaming elements and some virtual gaming elements remain on the display screen;

C. Less than all virtual gaming elements in the first original set of virtual gaming elements have been removed from the subsequent set of residual virtual gaming elements and virtual gaming elements having a same number as remain on the display screen as the randomly selected least four and fewer than twenty virtual gaming elements, and at least a predetermined number of the first original set of virtual gaming elements have been removed during execution of multiple repetitions of b), c), d) and e) has been met or exceeded; and D. Less than all virtual gaming elements in the first original set of virtual gaming elements have been removed from the subsequent set of residual virtual gaming elements and virtual gaming elements having a same number as remain on the display screen as the randomly selected least four and fewer than twenty virtual gaming elements, and at least a predetermined number of the first original set of virtual gaming elements have been removed during execution of multiple repetitions of b), c), d) and e) has not been met or exceeded;

wherein after a concluding event has occurred, the gaming processor determines and delivers an award for the player at least based upon which category of concluding event has occurred.

The gaming system and game event may have the first original set of virtual gaming elements comprises a number of virtual gaming elements between 10 and 60, and the randomly selected and displayed virtual images consist of between and including 8-16 virtual gaming elements.

The gaming system and game event may have the randomly selected and displayed virtual images consist of between and including 10-14 virtual gaming elements. The gaming system and game event may have the randomly selected and displayed virtual images consist of exactly 12 virtual gaming elements.

The gaming system and game event may have a value crediting and debiting system that receives player inputted value, and the player inputted value is used to place a wager on concluding events, and the game processor determines and delivers an award for the player at least based upon which category of concluding event has occurred and increments awards and decrements wagers against the value crediting and debiting system. The gaming system and game event may have the gaming processor configured to award relative amounts of awards, from higher amounts to lower amounts according to an order of A, B, C and D. The gaming system and game event may have the gaming processor configured to award relative amounts of awards, from higher amounts to lower amounts according to an order of A, B, C and D, with an added bonus if the some virtual gaming elements remaining on the display screen are specifically preidentified virtual gaming elements.

The gaming system and game event may have the first original set of virtual gaming elements comprises a number of virtual gaming elements between 50 and 56, and the randomly selected and displayed virtual images consist of 12 virtual gaming elements.

A first aspect of the present disclosure is generally directed to execution of an event where a set of playing cards, typically in the form of at least a standard set of playing cards (physical or virtual), is used to provide gaming elements assigning different card values generally ranging from 1 to 12 (generally, because certain specialty gaming elements may have functions, such as an absolute other card eliminator, or a blocking card which cannot be eliminated unless there is at least one other and up to four others of the same specially marked cards), or with specific action functions as explained below. A first fixed number of playing cards in excess of two, and typically from 4 to twelve playing cards is initially displayed on a real or virtual surface. The player executes controls (manually in a physical card event) or by player controls in an electronic version (e.g., buttons, touchscreen, voice recognition, joy stick, etc.) to take action with specific revealed playing cards.

An aspect of the underlying gaming event is to eliminate cards from the playing surface. In its most basic format, cards are typically eliminated and removed by identifying and selecting two specific revealed cards whose point count total equals a specific value, particularly a total value of "12" in the execution of the most preferred game. Specific single cards may also be treated in the execution of the game as 12-point cards which may be eliminated as a single card, or a limited number of functional cards that may be eliminated in combination with any other card.

The method may also be alternatively or jointly executed wherein there are at least two player positions and at least two display systems and at least two player input controls, and wherein in addition to the gaming processor being determining a concluding event has occurred, the gaming processor determines and delivers an award for the player at least based upon which category of concluding event has occurred, the gaming processor also declares a winner as among the at least two players and a separate award is delivered to the winner based on game achievement parameters.

In terms of technical effects, the gaming system, device and game execution achieves a designated game volatility and RTP that complies with regulation for a game feature. In the case of randomly assigned multipliers from secondary events, the RTP can be balanced by using weighted lookup tables, or by using different lookup tables for different outcomes to determine the multiplier.

The gaming system also improves computer usability and enhances the player's understanding and experience. For example, there may be a second screen over the first display screen, on which information such as event status (how many gaming elements have been removed, how many remain until a minimum win goal has been achieved, how many specific specialty gaming elements remain, how many total gaming elements remain in the residual set, and other features that may be instructive or helpful to a gaming player.

In some examples, various described features may be implemented as part of a base game, a bonus game, a feature game, or a combination of these.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that might act in concert with one or more aspects of the present disclosure (as in U.S. Pat. No. 9,997,013, Litman). The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or game of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks known as LANs and enterprise networks), and the like (e.g., wide area networks known as WANs). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some single player implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number of frames with various symbols of gaming elements are shown displayed on them. The replacement of withdrawn gaming elements may be automatic or activated by player input 130 to show a set of symbols of gaming elements within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 130, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a top gaming content or entertainment display 100. When bonus play is triggered (e.g., by a player achieving a particular outcome or set of outcomes in the primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
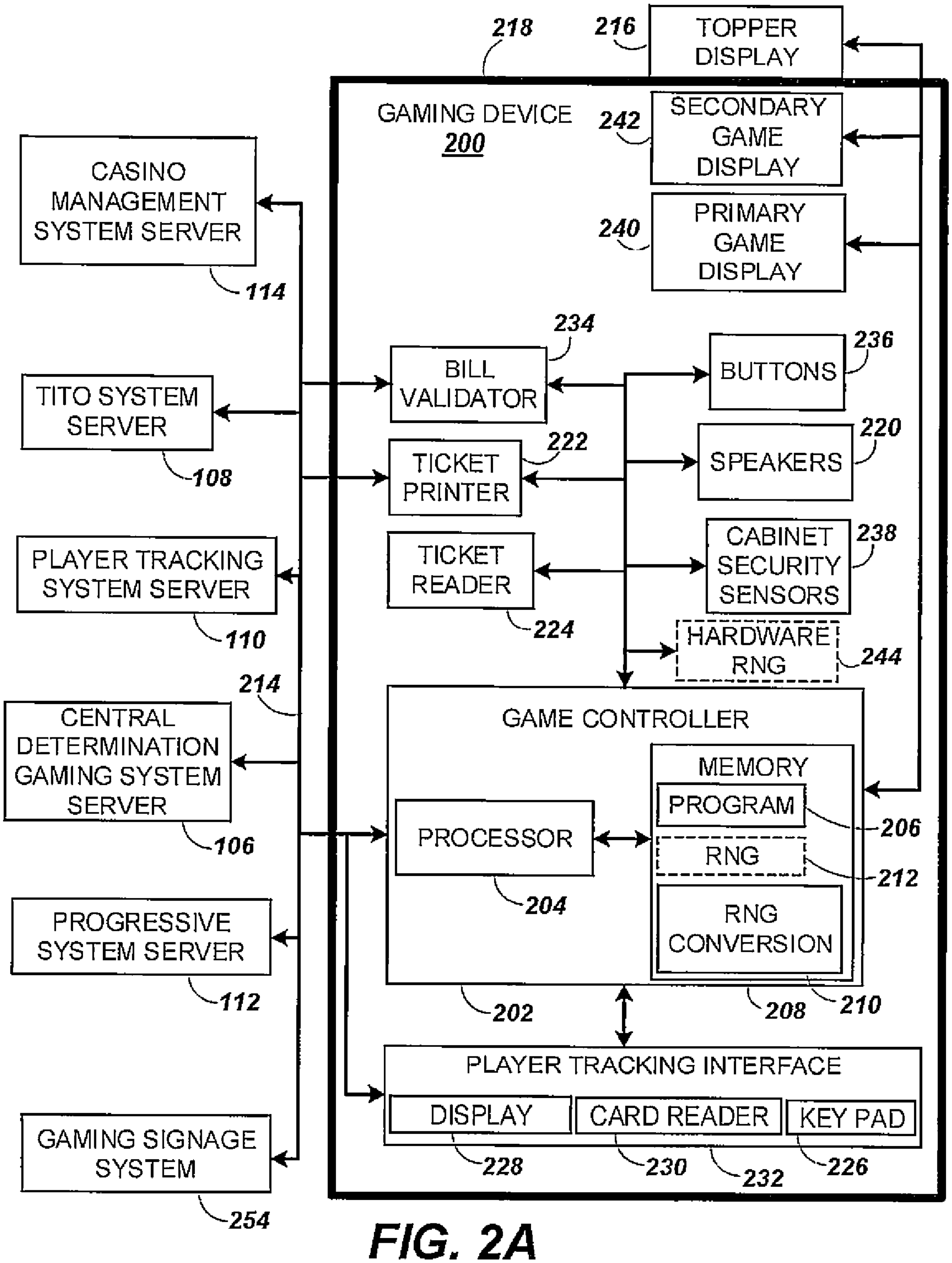
FIG. 2A shows components which can be controlled by circuitry (e.g., a game controller) housed inside the main cabinet.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

(43) The game available for play on the gaming device 200 are controlled by a game controller 202 that includes processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processor and/or one or more specialized processor.

Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations or variations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a gaming element elimination and replacement game, game program 206 can initiate multiple RNG calls to RNG 212 to generate RNG outcomes, where each RNG call and RNG outcome corresponds to an outcome for a replacement or original delivery of a gaming element. In another example, gaming device 200 can be a Class II gaming device where RNG 212 generates RNG outcomes for creating secondary or jackpot events. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudo-random number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as specialty cards, differing shapes of gaming elements to assist in pairing eliminating combinations, or new cards; stop positions for dynamic game elements such as card placement, bonus reels; or gaming elements selections from a ste) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each gam outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per gaming event line and the number of games and bonuses played. In many games, the player is asked to initiate or select options during course of game play (such as electing different paytables, selecting base numbers of original number of gaming elements displayed, spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is of course not limited to those implementations shown in FIGS. 1 and 2A. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of flipping gaming elements reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
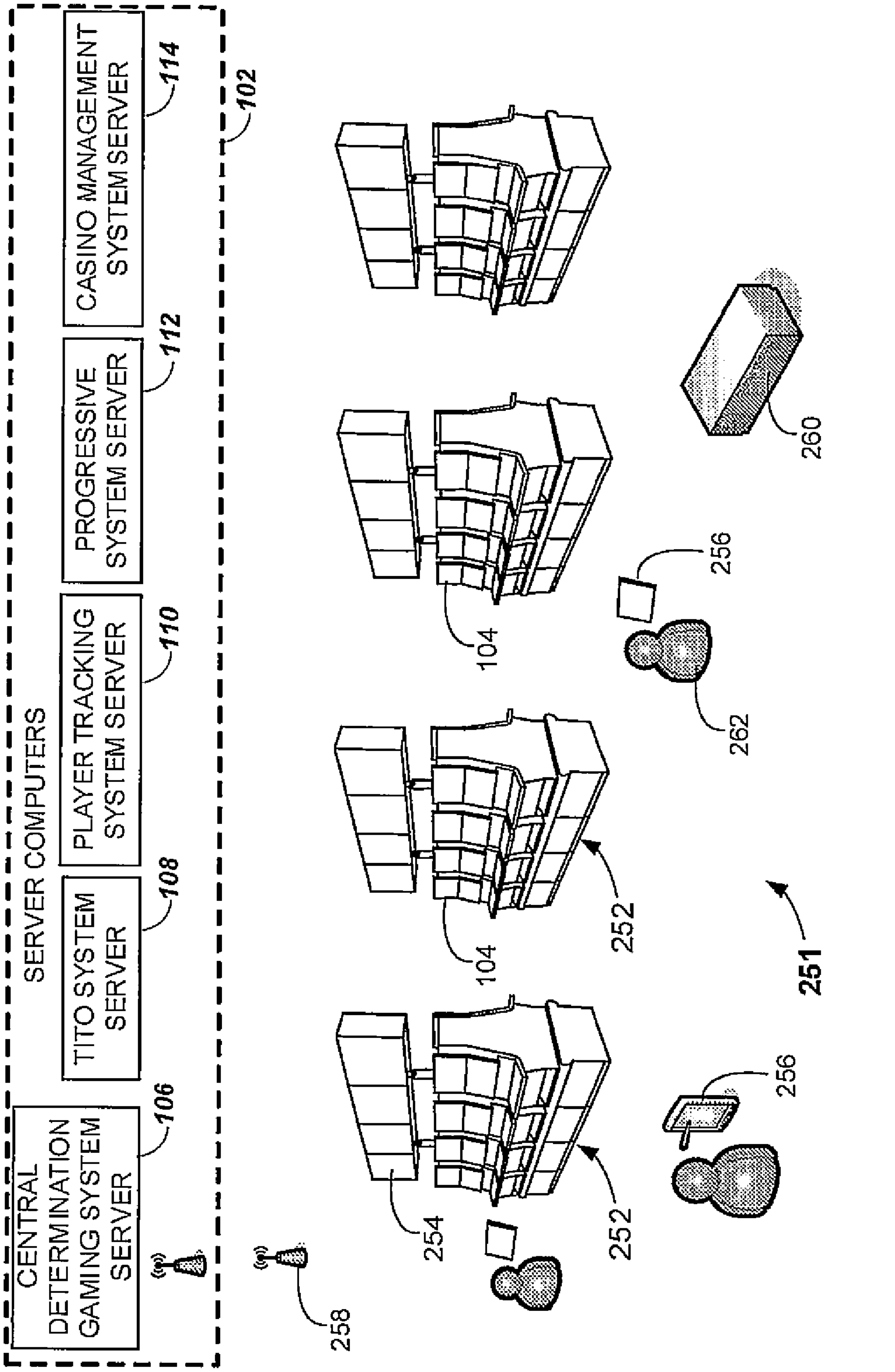
FIG. 2B is a diagram that shows examples of components of a system for providing online gaming according to some aspects of the present disclosure.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
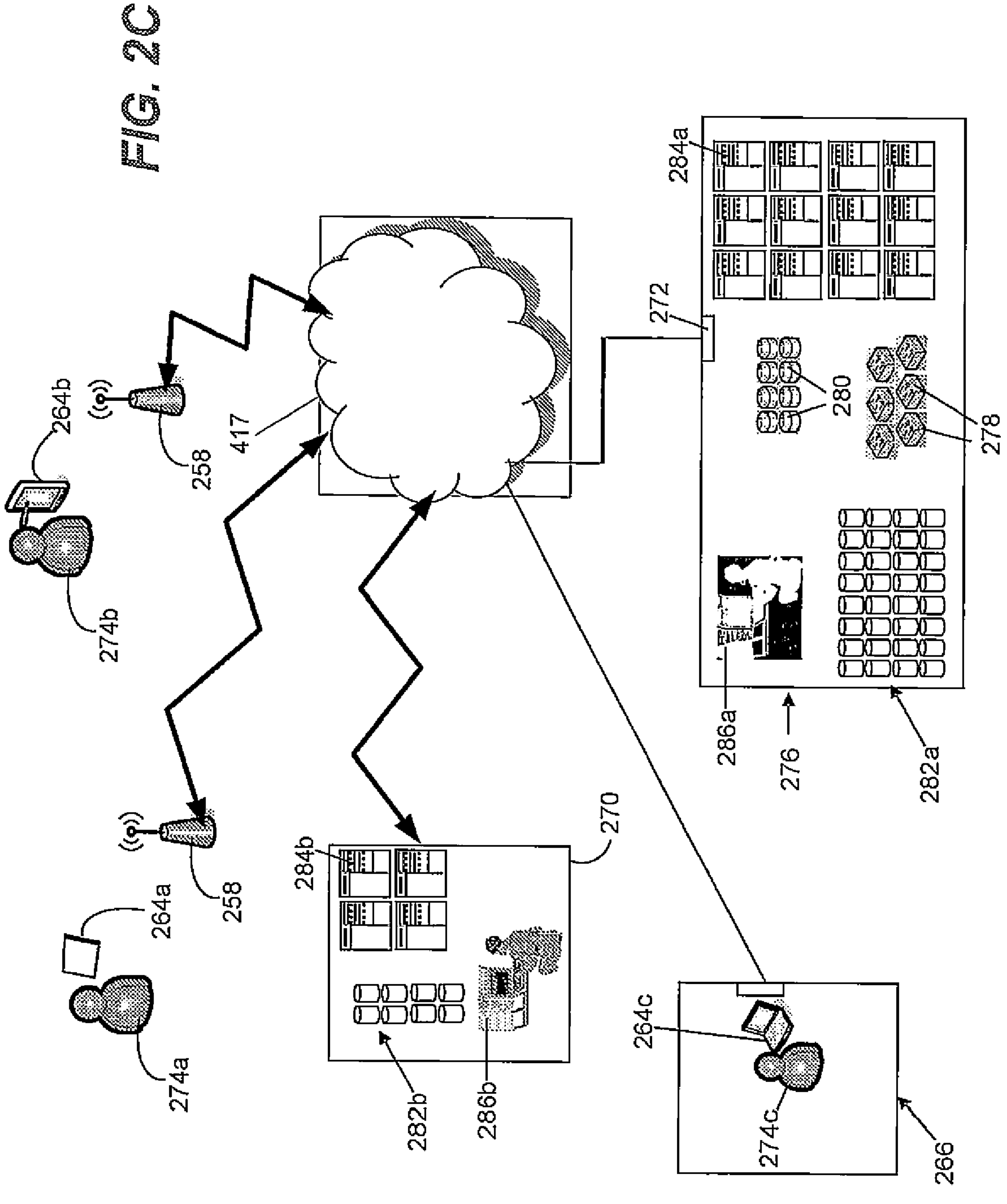
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the game may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the gam according to selections made by a player and indicated via the player's EUD. In other examples, code for executing at least some of the game may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
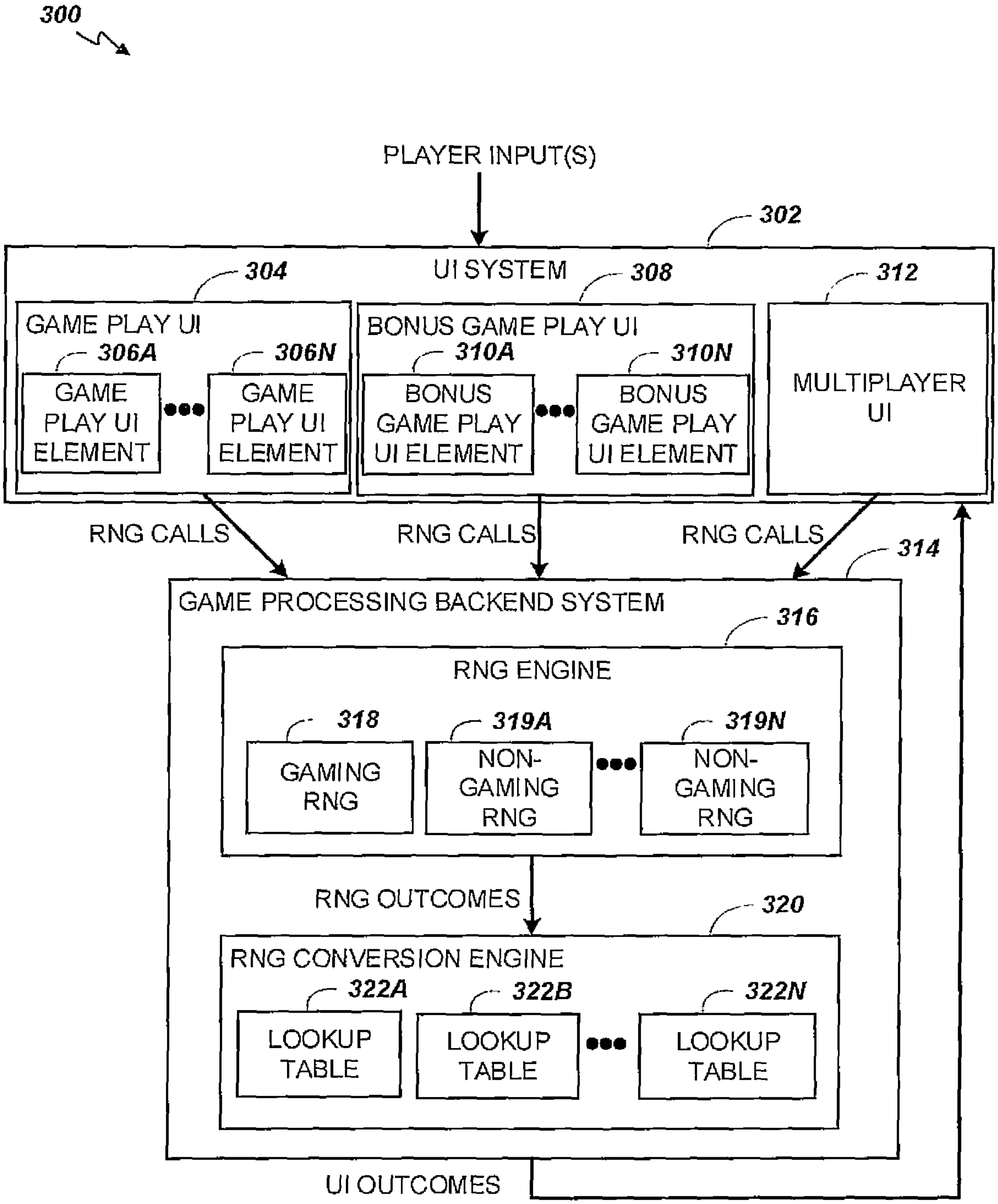
FIG. 3 illustrates, in block diagram form, an implementation of a game processing architecture.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual sets of gaming elements to be eliminated) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video screen or other virtual stopping point in game play. In one example, if the UI outcome is for a base game, the UI system 302 updates one or more game play UI elements 306A-306N, such as symbols, playing cards, tiles, images, etc., for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The example game processing architecture 300 shown in FIG. 3 can be used to process game play instructions and generate outcomes as follows. In some example implementations, the game processing architecture 300 implements a game processing pipeline for a process (e.g., base gaming element game, bonus reel game, feature additional game, etc.) that converts consecutive winning outcomes that could contribute to a "win combination" to a single gaming event and selects a multiplier based on the number of preceding positive game outcomes, merge assigned multipliers of adjacent or consecutive games, or the like. The UI system 302 (e.g., the game play UI 304 or bonus game play UI 308 of the UI system 302) causes the display system (e.g. display 240, 242) to display a single symbol in place of a stacked reel and a multiplier assigned based on the number of preceding stacked reels, a merged multiplier representing the product of assigned multipliers of adjacent games or adjacent or associated EGMs, or the like. For a play, the UI system 302 (e.g., the game play UI 304 or bonus game play UI 308) makes one or more RNG calls to the game processing backend system 314. In response, the backend system 314 performs various operations. For example, using a gaming RNG 318, the RNG engine 316 generates one or more random numbers, which are passed to the RNG conversion engine 320. In various embodiments, the RNG conversion engine 320, can use one or more of the random number(s) and one or more of the lookup tables 322A . . . 322N, to determine a set of display symbols to populate the frames for displaying the gaming elements that can be eliminated, to select a selected special symbol to substitute for dynamic symbols, or the like. After determining a game outcome, including combining the product of assigned multipliers of associated display elements or screens that are part of a "win combination" (e.g. a payline etc.), or the like, the backend system 314 performs a pay evaluation or otherwise determines results (e.g., calculating whether any win conditions exist). The backend system 314 returns generated result to the game play UI 304 or bonus game play UI 308 of the UI system 302, which can among other operations control display of the game outcome and results corresponding to the pay evaluation. For example, the game play UI 304 or bonus game play UI 308 in various embodiments may stop the spinning of reels at the display symbols determined for respective reel outcomes, replace eliminated gaming elements from frames (fully populated with special symbols) with a single symbol and a multiplier assigned based on the number of preceding positive events, merge assigned multipliers for adjacent stacked reels to display a single multiplier that is the product of the assigned multipliers, indicate win paths, or the like.

In general, the generated results returned by the backend system 314 can include game-related information (such as display symbols for the respective reels, outcomes) as well as animation effects not related to game parameters. Alternatively, the game play UI 304 (or bonus game play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or bonus game play UI 308) can perform operations consistent with the animation effects, which are returned from the backend system 314.

The initial game is similar to the game of Solitaire, in that it is played solely by an individual with a standard deck of cards.

A strategic aspect of the game is to add two cards together that add up to 12, then remove these two cards from an initial opening of 12 upturned cards and replacing them from the deck. If you can get through the whole deck removing two cards at a time that add up to 12, you win (with the less card turns the better).

The difficulty in getting through the deck are the picture cards: Ace, King, Queen and Jack, as these take up spaces from the numbered cards, and can only be removed when all four cards of the different suits are among the 12 cards. Only then can they be replaced with four new cards.

Although enjoyable, the initial game may lack sufficient strategy, which has led to the current format and new ideas for the game. We envisage this development to be continuous, however there are basic fundamentals of "12" that we intend to protect under patent, while also allowing for future rule and strategy changes.

Although cards were initially used in the physical sense, the electronic format allows these to be converted to tokens, tablets, badges, symbols, pictures, shapes or any images that suit a particular adaptation of the game.

Adaptations can be arranged so that numerous formats can be overlayed on the rules of "12", so long as the mathematical computations fit within the "12" framework.

Some adaptation examples that can be used include; calendar months, zodiac signs, sports with teams of around 12 players that may include umpires and coaches (e.g. American football, soccer, cricket, hockey, netball, even basketball with benched players), as well as domino tablets, plain numbers, Roman numerals, as well as most numeric systems from various languages.

The initial app development showed that it was difficult to complete the game and win under the original rules, resulting in the following current changes:

1 or 11: The original "Ace" position has been replaced from a blocking picture card, to now equal 1 or 11, so that two of these now equals 12 and can then be replaced (1+11). Accordingly, instead of having to wait for 4× Aces before replacing them out in the original game, this can now be done in two sets of 2, similar to the 6, where two sets of 2×6=12.

The Closer

The role of the Closer or the 12$^{th}$ position now replaces the Jack. With a single token value of 12, it retains its role as a blocker, and can only be substituted out of the game if all four are in play. To substitute them however is optional, as more points may be awarded if all four Closers remain at the end of the game, as they close out the game in their "closing role" position. It may be necessary however to substitute all four out during the game to keep the game alive, when there are no other "12" combinations in play. This may reduce available points on completion, however increases the chances of completion.

The Saboteur

Similar to the Closer, the Saboteur is a blocker and can only be substituted out when all four are in play. The Saboteur has no numeric value like the Closer, and has the simple role of blocking completion. As with the Closer, more points are available if all four Saboteurs remain in play at the end of the game, however necessity may require substituting them out earlier.

The Overseer

The role of the Overseer is to keep the game even, and offer the player strategic options to stay in the game. Whenever an Overseer is in play, and the player is blocked out of 12 combinations, the Overseer can be flipped allowing the player to swap and replace any one of the remaining 11 positions. One likely variation of the fundamental rules is that an Overseer can only be flipped once, and can be saved until required so that all four Overseers may be in play until a swap is required (this may vary).

The player has to choose what position to swap out when an Overseer is used, based on their risk strategy. For example, rather than simply using an Overseer to swap out a Closer or a Saboteur to return later, a player may choose to swap out a numbered card if there is excess of the same card so that it can return later when its alternative 12 number is in play e.g., 4×10's are in play and only one Saboteur.

Another strategy may be when there are four Closers or Saboteurs among the 11 remaining positions in play. Rather than substituting out the four and increasing the chances of finishing the game, the player may choose to use an Overseer to replace one of them, and risk not completing the next 12 move. The benefit could be however, if the player does finish the game, the replaced position eventually comes back into play and the four positions may be among the last 12, increasing the score value.

Game Objectives

The first objective of the game is to continually replace two positions that add up to 12, from the initial 12 in play, without being blocked out until completion.

Following on from this fundamental objective, other objectives may be for a point system or odds return system based on the following:

- Finish the game with the least number of turns.
- Finish the game with the most Closers, Saboteurs and Overseers left in the remaining 12 positions as possible (e.g., 4, 8 or 12).
- Extra values for Overseers left that were not flipped.
- A jackpot may be to have no numbers left in the remaining 12, with an ultimate goal/jackpot of the top line finished with the Closers, second line with the Saboteurs and un-flipped Overseers on the bottom line (extremely unlikely).

The following is an example of adaptations of the rules of "12":

Some Adaptation Examples

| Number or Role | Chinese Zodiac | Calendar | Soccer Shirt/Position/ Image | Deck of Cards |
|---|---|---|---|---|
| 1 or 11 | Rat 1 & Dog 11 | Jan 1 & Nov 11 | G/keeper 1 saves opp striker 11 | Ace |
| 2 | Ox | February | Pass to 10 | 2 |
| 3 | Tiger | March | Pass to 9 | 3 |
| 4 | Rabbit | April | Pass to 8 | 4 |
| 5 | Dragon | May | Pass to 7 | 5 |
| 6 | Snake | June | Pass to 6 | 6 |
| 7 | Horse | July | Receive from 5 | 7 |
| 8 | Goat | August | Receive from 4 | 8 |
| 9 | Monkey | September | Receive from 3 | 9 |
| 10 | Rooster | October | Receive from 2 | 10 |
| 12 the Closer | Pig | December | The Coach | Jack |
| the Saboteur | Cat | Moon | Opposition Goal | Queen |
| the Overseer | Jade Emperor | Sun | The Referee | King |

"12": The Chinese Zodiac

Adapting the storyline of the Chinese Zodiac ($2^{nd}$ column above), within the framework rules, roles and numbered positions of the game of "12" (first column), gives the game further context and direction.

The Story of the Chinese Zodiac

An ancient folk story called the "Great Race" tells that the Jade Emperor decreed that the years on the calendar would be named for each animal in the order they reached him. To get there, the animals would have to cross a river.

The Cat and the Rat were not good at swimming, but they were both quite intelligent. They decided that the best and fastest way to cross the river was to hop on the back of the Ox. The Ox, being kind-hearted and naïve, agreed to carry them both across. As the Ox was about to reach the other side of the river, the Rat pushed the Cat into the water, and then jumped off the Ox and rushed to the Jade Emperor. It was named as the first animal of the zodiac calendar. The Ox had to settle in second place.

The third one to come, was the Tiger. Even though it was strong and powerful, it explained to the Jade Emperor that the currents were pushing him downstream.

Suddenly, from a distance came a thumping sound, and the Rabbit arrived. It explained how it crossed the river: by jumping from one stone to another, in a nimble fashion. Halfway through, it almost lost the race, but it was lucky enough to grab hold of a floating log that later washed him to shore. For that, it became the fourth animal in the zodiac cycle.

In fifth place, was the flying Dragon. The Jade Emperor was wondering why such a swift airborne creature such as the Dragon did not come in first. The Dragon explained that it had to stop by a village and brought rain for all the people, and therefore it was held back. Then, on its way to the finish, it saw the helpless Rabbit clinging onto a log, so it did a good deed and gave a puff of breath to the poor creature so that it could land on the shore. The Jade Emperor was astonished by the Dragon's good nature, and it was named as the fifth animal.

As soon as it had done so, a galloping sound was heard, and the Horse appeared. Hidden on the Horse's hoof was the Snake, whose sudden appearance gave it a fright, thus making it fall back and giving the Snake the sixth spot while the Horse placed seventh.

After a while, the Goat, Monkey and Rooster came to the heavenly gate. With combined efforts, they managed to arrive to the other side. The Rooster found a raft, and the Monkey and the Goat tugged and pulled, trying to get all the weeds out of the way. The Jade Emperor was pleased with their teamwork and decided to name the Goat as the eighth animal, followed by the Monkey and then the Rooster.

The eleventh animal placed in the zodiac cycle was the Dog. Although it should have been the best swimmer and runner, it spent it's time to play in the water. Though his explanation for being late was because it needed a good bath after. For that, it almost did not make it to the finish line.

Right when the Emperor was going to end the race, an "oink" sound was heard: it was the Pig. The Pig felt hungry in the middle of the race, so it stopped, ate something, and then fell asleep. After it awoke, it finished the race in twelfth place and became the last animal to arrive.

The cat eventually drowned and failed to be in the zodiac. It is said that this is the reason cats always hunt rats and also hate water as well.

Adapting the story to the game—The numbers then are aligned with the finishing order of the "Great Race" so that the token number for the picture of the Ox is 2, followed by the Tiger as 3 etc. The Rat and the Dog (both the arch enemy of the Cat), feature on a combined token of 1 and 11.

The Pig, being the last to finish the race, is the Closer with the number 12, while the Cat seeks its revenge as the Saboteur role.

The Jade Emperor plays the role of the Overseer and features on that token (or physical card).

Additional Uses of the Game "12"

Educational Value—As mentioned, the game 12 can be adapted to many formats to suit many purposes. For example, the calendar year can be used as an educational tool, not only as a teaching aid for "addition" in mathematics, but also reinforcing the calendar months and their order. The moon orbits the earth approximately 13 times in a calendar year so can play the role of the Saboteur, where as the sun can play the role of the Overseer given the calendar year is based on the earth orbiting the sun each year.

Similarly, team sports can be overlayed on the games format and create extra motivation to learn math.

The technology of the present invention further includes a non-transitory computer readable storage medium comprising computer readable code executable by one or more processors to: randomly determine, using a first random number generator output, display symbols on a display screen for a game controller executing instructions which cause the game controller to execute a method comprising:

a) randomly selecting and displaying on the display system virtual images of at least four and fewer than twenty virtual gaming elements randomly selected from a first original set of virtual gaming elements, at least the majority of which virtual gaming elements having indicia thereon representing numeric values;
b) the removal of the at least four virtual gaming elements creating a first residual set of virtual gaming elements of at least four virtual gaming elements;
c) a player at the gaming controls identifying two of the at least four displayed virtual gaming elements as having a single specific predetermined numerical value;
d) upon identification by the player of the identified two of the at least four displayed virtual gaming elements having the single specific predetermined numerical value, the processor executes software to remove the virtual images of the identified two of the at least four displayed virtual gaming elements from the display screen;
e) after removing the virtual images of the identified two of the at least four displayed virtual gaming elements from the display screen, the game controller randomly selects exactly two virtual gaming elements from the first residual set of virtual gaming elements, replenishing the virtually displayed images of at the least four and fewer than twenty virtual gaming elements, and creating a subsequent set of residual virtual gaming elements;
f) repeating actions b), c), d) and e), with decreasingly fewer virtual gaming elements in the subsequent set of residual virtual gaming elements until one of the following categories of concluding event has occurred:
   A. All virtual gaming elements in the first original set of playing cards have been removed from the subsequent set of residual virtual gaming elements and removed from the display screen;
   B. All virtual gaming elements in the first original set of virtual gaming elements have been removed from the subsequent set of residual virtual gaming elements and some virtual gaming elements remain on the display screen;
   C. Less than all virtual gaming elements in the first original set of virtual gaming elements have been removed from the subsequent set of residual virtual gaming elements and virtual gaming elements having a same number as remain on the display screen as the randomly selected least four and fewer than twenty virtual gaming elements, and at least a predetermined number of the first original set of virtual gaming elements have been removed during execution of multiple repetitions of b), c), d) and e) has been met or exceeded; and
   D. Less than all virtual gaming elements in the first original set of virtual gaming elements have been removed from the subsequent set of residual virtual gaming elements and virtual gaming elements having a same number as remain on the display screen as the randomly selected least four and fewer than twenty virtual gaming elements, and at least a predetermined number of the first original set of virtual gaming elements have been removed during execution of multiple repetitions of b), c), d) and e) has not been met or exceeded;

wherein after a concluding event has occurred, the gaming processor determines and delivers an award for the player at least based upon which category of concluding event has occurred.

The invention claimed is:

1. A gaming system comprising:
a display system;
player input controls, and
a game controller comprising one or more processors; and
a random number generator;
the game controller executing instructions which cause the game controller to:
a) randomly select and display on the display system virtual images of a specific number of between 8 and 16 virtual gaming elements randomly selected from a first original set of virtual gaming elements, at least the majority of which virtual gaming elements having indicia thereon representing numeric values;
b) the removal of the between 8 and 16 virtual gaming elements from the first original set of virtual gaming elements creating a first residual set of virtual gaming elements of between eight and 16 virtual gaming elements;
c) receiving an input from a player via the gaming controls identifying two of the between 8 and 16 displayed virtual gaming elements as having a point count total that equals a single specific predetermined numerical value of 12;
d) upon receiving the input identifying two of the between 8 and 16 displayed virtual gaming elements having the single specific predetermined numerical value or a single gaming element determined to have the single specific predetermined value of 12, the processor executes software to remove the virtual images of the identified two or the single gaming element predetermined to have the single specific predetermined value of 12 displayed virtual gaming elements from the display screen;
e) after removing the virtual images of the identified two of the between 8 and 16 displayed virtual gaming elements from the display screen, the game controller randomly selects exactly two virtual gaming elements from the first residual set of virtual gaming elements plus the number of single gaming elements removed for having the single specific predetermined value of 12, replenishing the virtually displayed images of the specific number of the between 8 and 16 virtual gaming elements, and creating a subsequent set of residual virtual gaming elements;
f) repeating actions b), c), d) and e), with decreasingly fewer virtual gaming elements in the subsequent set of residual virtual gaming elements until one of the following categories of concluding event has occurred:
   A. All virtual gaming elements in the first original set of gaming elements have been removed from the subsequent set of residual virtual gaming elements and removed from the display screen;
   B. All virtual gaming elements in the first original set of virtual gaming elements have been removed from the subsequent set of residual virtual gaming elements and some virtual gaming elements remain on the display screen;

C. Less than all virtual gaming elements in the first original set of virtual gaming elements have been removed from the subsequent set of residual virtual gaming elements and virtual gaming elements having a same number as remain on the display screen as the randomly selected between 8 and 16 virtual gaming elements, and at least a predetermined number of the first original set of virtual gaming elements have been removed during execution of multiple repetitions of b), c), d) and e) has been met or exceeded; and D. Less than all virtual gaming elements in the first original set of virtual gaming elements have been removed from the subsequent set of residual virtual gaming elements and virtual gaming elements having a same number as remain on the display screen as the randomly selected between 8 and 16 virtual gaming elements, and at least a predetermined number of the first original set of virtual gaming elements have been removed during execution of multiple repetitions of b), c), d) and e) has not been met or exceeded;

wherein after a concluding event has occurred, the gaming processor determines and delivers an award for the player at least based upon which category of concluding event has occurred.

2. The gaming system of claim 1 wherein the first original set of virtual gaming elements comprises a number of virtual gaming elements between 10 and 60, and the virtual number includes four gaming elements identified as blockers which can be removed from the display screen only when all four blockers are displayed on the screen at a single time.

3. The gaming system of claim 2 wherein randomly selected and displayed virtual images consist of between and including 10-14 virtual gaming elements comprising playing cards or playing card images.

4. The gaming system of claim 3 further comprising a value crediting and debiting system that receives player inputted value, and the player inputted value is used to place a wager on concluding events, and the game processor determines and delivers an award for the player at least based upon which category of concluding event has occurred and increments awards and decrements wagers against the value crediting and debiting system.

5. The gaming system of claim 4, wherein the gaming processor is configured to award relative amounts of awards, from higher amounts to lower amounts according to an order of A, B, C and D.

6. The gaming system of claim 4, wherein the gaming processor is configured to award relative amounts of awards, from higher amounts to lower amounts according to an order of A, B, C and D, with an added bonus if the virtual gaming elements remaining on the display screen are specifically preidentified virtual gaming elements.

7. The gaming system of claim 1 wherein the first original set of virtual gaming elements comprises a number of virtual gaming elements between 50 and 56, and the randomly selected and displayed virtual images consist of 12 virtual gaming elements.

8. The gaming system of claim 1 wherein the player input controls are on a player system selected from the group consisting of a player computer, a player laptop, a player pad, a player smartphone, or player game system dedicated personal device, each player system having a processor communicationally linked to a distal processor in the gaming controller.

9. The gaming system of claim 1 wherein there are at least two player positions and at least two display systems and at least two player input controls, and wherein in addition to the gaming processor being configured so that after a concluding event has occurred, the gaming processor determines and delivers an award for the player at least based upon which category of concluding event has occurred, the gaming processor also declares a winner as among the at least two players and a separate award is delivered to the winner based on game achievement parameters.

10. A method of executing a gaming event on a gaming system comprising:

a display system; player input controls, and a game controller comprising one or more processors; and a random number generator;

the game controller executing instructions which cause the game controller to execute a method comprising:

a) randomly selecting and displaying on the display system virtual images of between 8 and 16 virtual gaming elements randomly selected from a first original set of virtual gaming elements, at least the majority of which virtual gaming elements having indicia thereon representing numeric values;

b) the removal of the between 8 and 16 virtual gaming elements creating a first residual set of virtual gaming elements of the between 8 and 16 virtual gaming elements;

c) receiving an input from a player via the gaming controls identifying two of the between 8 and 16 displayed virtual gaming elements as having a single specific predetermined total numerical value;

d) upon receiving the input identifying two of the at least four displayed virtual gaming elements having the single specific predetermined numerical value, the processor executes software to remove the virtual images of the identified two of the between 8 and 16 displayed virtual gaming elements from the display screen;

e) after removing the virtual images of the identified two of the between 8 and 16 displayed virtual gaming elements from the display screen, the game controller randomly selects exactly two virtual gaming elements from the first residual set of virtual gaming elements, replenishing the virtually displayed images of between 8 and 16 virtual gaming elements, and creating a subsequent set of residual virtual gaming elements;

f) repeating actions b), c), d) and e), with decreasingly fewer virtual gaming elements in gaming elements for display in the subsequent set of residual virtual gaming elements until one of the following categories of concluding event has occurred:

A. All virtual gaming elements in the first original set of gaming elements have been removed from the subsequent set of residual virtual gaming elements and removed from the display screen;

B. All virtual gaming elements in the first original set of virtual gaming elements have been removed from the subsequent set of residual virtual gaming elements and some virtual gaming elements remain on the display screen;

C. Less than all virtual gaming elements in the first original set of virtual gaming elements have been removed from the subsequent set of residual virtual gaming elements and virtual gaming elements having a same number as remain on the display screen as the randomly selected between 8 and 16 virtual gaming elements, and at least a predetermined number of the first original set of virtual gaming elements have been removed during execution of multiple repetitions of b), c), d) and e) has been met or exceeded; and D. Less than all virtual gaming elements in the first original set of virtual gaming elements have been removed from the subsequent set of residual virtual gaming elements and virtual gaming elements having a same number as remain on the display screen as the randomly selected between 8 and 16 virtual gaming elements, and at least a predetermined number of the first original set of virtual gaming elements have been removed during execution of multiple repetitions of b), c), d) and e) has not been met or exceeded;

wherein after a concluding event has occurred, the gaming processor determines and delivers an award for the player at least based upon which category of concluding event has occurred.

11. The method of claim 10 wherein there are at least two player positions and at least two display systems and at least two player input controls, and wherein in addition to the gaming processor being determining a concluding event has occurred, the gaming processor determines and delivers an award for the player at least based upon which category of concluding event has occurred, the gaming processor also declares a winner as among the at least two players and a separate award is delivered to the winner based on game achievement parameters.

12. The method of claim 11 wherein the first original set of virtual gaming elements is delivered as a set comprising a number of virtual gaming elements between 10 and 60, and the randomly selected and displayed virtual images consist of between and including 10-14 virtual gaming elements.

13. The method of claim 12 wherein the first original set of virtual gaming elements is delivered as a set comprising randomly selected and displayed virtual images and the virtual number includes four virtual gaming elements identified as blockers which can be removed from the display screen only when all four blockers are displayed on the screen at a single time.

14. The gaming system of claim 13 further comprising a value crediting and debiting system that receives player inputted value, and the player inputted value is used to place a wager on concluding events, and the game processor determines and delivers an award for the player at least based upon which category of concluding event has occurred and increments awards and decrements wagers against the value crediting and debiting system.

15. A non-transitory computer readable storage medium comprising computer readable code executable by one or more processors to: randomly determine, using a first random number generator output, display symbols on a display screen for a game controller executing instructions which cause the game controller to execute a method comprising:

a) randomly selecting and displaying on the display system virtual images of at least four and fewer than twenty virtual gaming elements randomly selected from a first original set of virtual gaming elements, at least the majority of which virtual gaming elements having indicia thereon representing numeric values;

b) the removal of the at least four virtual gaming elements creating a first residual set of virtual gaming elements of between 8 and 16 virtual gaming elements;

c) receiving an input from a player via the gaming controls identifying two of the between 8 and 16 displayed virtual gaming elements as having a single specific predetermined numerical value;

d) upon receiving the input identifying two of the between 8 and 16 displayed virtual gaming elements having the single specific predetermined numerical value, the processor executes software to remove the virtual images of the identified two of the between 8 and 16 displayed virtual gaming elements from the display screen;

e) after removing the virtual images of the identified two of the between 8 and 16 displayed virtual gaming elements from the display screen, the game controller randomly selects exactly two virtual gaming elements from the first residual set of virtual gaming elements, replenishing the virtually displayed images of the between 8 and 16 virtual gaming elements, and creating a subsequent set of residual virtual gaming elements;

f) repeating actions b), c), d) and e), with decreasingly fewer virtual gaming elements in the subsequent set of residual virtual gaming elements until one of the following categories of concluding event has occurred:

A. all virtual gaming elements in the first original set of virtual gaming elements have been removed from the subsequent set of residual virtual gaming elements and removed from the display screen;

B. all virtual gaming elements in the first original set of virtual gaming elements have been removed from the subsequent set of residual virtual gaming elements and some virtual gaming elements remain on the display screen;

C. less than all virtual gaming elements in the first original set of virtual gaming elements have been removed from the subsequent set of residual virtual gaming elements and virtual gaming elements having a same number as remain on the display screen as the randomly selected between 8 and 16 virtual gaming elements, and at least a predetermined number of the first original set of virtual gaming elements have been removed during execution of multiple repetitions of b), c), d) and e) has been met or exceeded; and D. less than all virtual gaming elements in the first original set of virtual gaming elements have been removed from the subsequent set of residual virtual gaming elements and virtual gaming elements having a same number as remain on the display screen as the randomly selected least four and fewer than twenty virtual gaming elements, and at least a predetermined number of the first original set of virtual gaming elements have been removed during execution of multiple repetitions of b), c), d) and e) has not been met or exceeded;

wherein after a concluding event has occurred, the gaming processor determines and delivers an award for the player at least based upon which category of concluding event has occurred.

16. A method of executing a gaming event on a physical gaming table comprising:

a) a physical gaming table with a player position;

the method comprising:

b) randomly selecting and displaying on the gaming table between 8 and 16 gaming elements randomly selected from a first original set of gaming elements, at least the majority of which gaming elements having indicia thereon representing numeric values;

b) the selected and displayed at least four gaming elements creating a first residual set of gaming elements of the between 8 and 16 gaming elements;

c) the player at the gaming table identifying two of the between 8 and 16 displayed gaming elements as having a single specific predetermined numerical value;

d) upon identification by the player of the identified two of the at least four displayed gaming elements having the single specific predetermined numerical value, removing the gaming elements of the identified two of the at least four displayed gaming elements from the gaming table and placing them into a discard pile on the gaming table;

e) after removing the identified two of the between 8 and 16 displayed gaming elements from the gaming table, randomly selecting exactly two gaming elements from the first residual set of gaming elements, replenishing remaining ones of the between 8 and 16 gaming elements, and creating a subsequent set of residual gaming elements;

f) repeating actions b), c), d) and e), with decreasingly fewer gaming elements in the subsequent set of residual gaming elements until one of the following categories of concluding events has occurred:

A. all gaming elements in the first original set of gaming elements have been removed from the subsequent set of residual gaming elements and removed from the player position at the gaming table;

B. all gaming elements in the first original set of gaming elements have been removed from the subsequent set of residual gaming elements and some gaming elements remain on the gaming table;

C. less than all gaming elements in the first original set of gaming elements have been removed from the subsequent set of residual gaming elements, and some gaming elements remain on the gaming table as the randomly selected between 8 and 16 gaming elements, and at least a predetermined number of the first original set of gaming elements have been removed during execution of multiple repetitions of b), c), d) and e) has been met or exceeded; and D. less than all gaming elements in the first original set of gaming elements have been removed from the subsequent set of residual gaming elements and some gaming elements remain on the gaming table, and at least that predetermined number of the first original set of gaming elements which have been removed during execution of multiple repetitions of b), c), d) and e) has not been met or exceeded;

wherein after a concluding event has occurred, an award is determined and delivered to the player at least based upon a gaming table defining awards and lack of awards according to which category of concluding event has occurred.

17. The method of claim 16, wherein there is also a dealer position, and the dealer provides physical playing cards as the gaming elements as required in the method.

18. The method of claim 16, wherein the first original set of virtual gaming elements is delivered as a set comprising randomly selected and displayed virtual images and the virtual number includes four virtual gaming elements identified as blockers which can be from the display screen only when all four blockers are displayed on the screen at a single time.

* * * * *